United States Patent
Johnston et al.

(10) Patent No.: US 11,673,997 B2
(45) Date of Patent: Jun. 13, 2023

(54) WORK TIME TO WALK-ON TIME RATIO BY ADDING A PHENOLIC CATALYST TO POLYASPARTIC FLOORING FORMULATIONS

(71) Applicant: COVESTRO LLC, Pittsburgh, PA (US)

(72) Inventors: Jay A. Johnston, Clinton, PA (US); Adam Miller, Pittsburgh, PA (US); Kevan Hudson, Clinton, PA (US)

(73) Assignee: COVESTRO LLC, Pittsburgh, PA (US)

( * ) Notice: Subject to any disclaimer, the term of this patent is extended or adjusted under 35 U.S.C. 154(b) by 987 days.

(21) Appl. No.: 16/527,459

(22) Filed: Jul. 31, 2019

(65) Prior Publication Data

US 2021/0032407 A1    Feb. 4, 2021

(51) Int. Cl.
| | | |
|---|---|---|
| C08G 73/02 | (2006.01) | |
| B01J 31/02 | (2006.01) | |
| C08G 18/46 | (2006.01) | |
| C08G 18/76 | (2006.01) | |
| C09D 175/02 | (2006.01) | |
| C08G 18/16 | (2006.01) | |
| C08G 18/28 | (2006.01) | |
| C08G 18/32 | (2006.01) | |
| C09J 175/02 | (2006.01) | |
| C08G 18/38 | (2006.01) | |
| C08G 18/79 | (2006.01) | |
| C08L 75/02 | (2006.01) | |

(52) U.S. Cl.
CPC ...... *C08G 73/0213* (2013.01); *B01J 31/0202* (2013.01); *C08G 18/168* (2013.01); *C08G 18/282* (2013.01); *C08G 18/283* (2013.01); *C08G 18/2825* (2013.01); *C08G 18/3215* (2013.01); *C08G 18/3821* (2013.01); *C08G 18/4623* (2013.01); *C08G 18/7635* (2013.01); *C08G 18/792* (2013.01); *C09D 175/02* (2013.01); *C09J 175/02* (2013.01); *C08G 2190/00* (2013.01); *C08L 75/02* (2013.01)

(58) Field of Classification Search
CPC ............ C08G 73/0213; C08G 18/4623; C08G 18/7635; C08G 2190/00; C08G 18/282; C08G 18/2825; C08G 18/283; C08G 18/3215; C08G 18/792; C08G 18/168; C08G 18/3821; B01J 31/0202; C09D 175/02; C08L 75/02; C09J 175/02
See application file for complete search history.

(56) References Cited

U.S. PATENT DOCUMENTS

2006/0247371 A1    11/2006    Mundstock et al.
2014/0194571 A1    7/2014    Weijnen et al.

FOREIGN PATENT DOCUMENTS

CN    109761834 A    *    5/2019
EP    3626755 A1        3/2020

OTHER PUBLICATIONS

Cardolite Chemistry for Tomorrow; Adhesives Product Overview; May 2017.

* cited by examiner

*Primary Examiner* — Rabon A Sergent
(74) *Attorney, Agent, or Firm* — John E. Mrozinski, Jr.; Richard P. Bender

(57) ABSTRACT

The present invention provides a polyaspartic composition comprising a reaction product of a polyamine and a Michael addition receptor reacted in the presence of a catalyst comprising a phenolic compound, with the proviso that the phenolic compound is not a phenol which is substituted with tert-butyl groups in both ortho positions to the oxygen. Suitable phenolic compounds include phenols, phenolic aldehydes, alkylphenols, benzenediols, cashew nut oil, and combinations thereof. Coatings, adhesives, sealants, composites, castings, and films comprising a polyurea composition may be made by reacting a polyisocyanate with the inventive polyaspartic composition. In particular, floor coatings made with the inventive polyaspartic composition have an elongated work time and a short walk-on time compared to current floor coatings.

13 Claims, 6 Drawing Sheets

US 11,673,997 B2

WORK TIME TO WALK-ON TIME RATIO BY ADDING A PHENOLIC CATALYST TO POLYASPARTIC FLOORING FORMULATIONS

FIELD OF THE INVENTION

The present invention relates in general to floor coatings, and more specifically, to a polyaspartic floor coating having an elongated work time and a short walk-on time.

BACKGROUND OF THE INVENTION

One of the problems in the art is that flooring contractors desire a long work time and as short of a walk-on time as possible for polyaspartic floor coatings. Commercially available formulations typically provide a work time of 10 to 15 minutes with a walk-on time of between three and one-half and eight hours. Speeding up the reaction causes both the work time and the walk-on time to decrease. Slowing the reaction increases both the work time and the walk-on time.

To reduce or eliminate problems therefore, a need exists in the art for a polyaspartic coatings formulation which would provide an increased work time over commercially available formulations, while not increasing the walk-on time appreciably.

SUMMARY OF THE INVENTION

Accordingly, the present invention reduces or eliminates problems inherent in the art by providing a polyaspartic formulation catalyzed by a phenolic compound, which provides increased work times compared to commercially available formulations. The inventive formulation does not increase the walk-on time appreciably.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
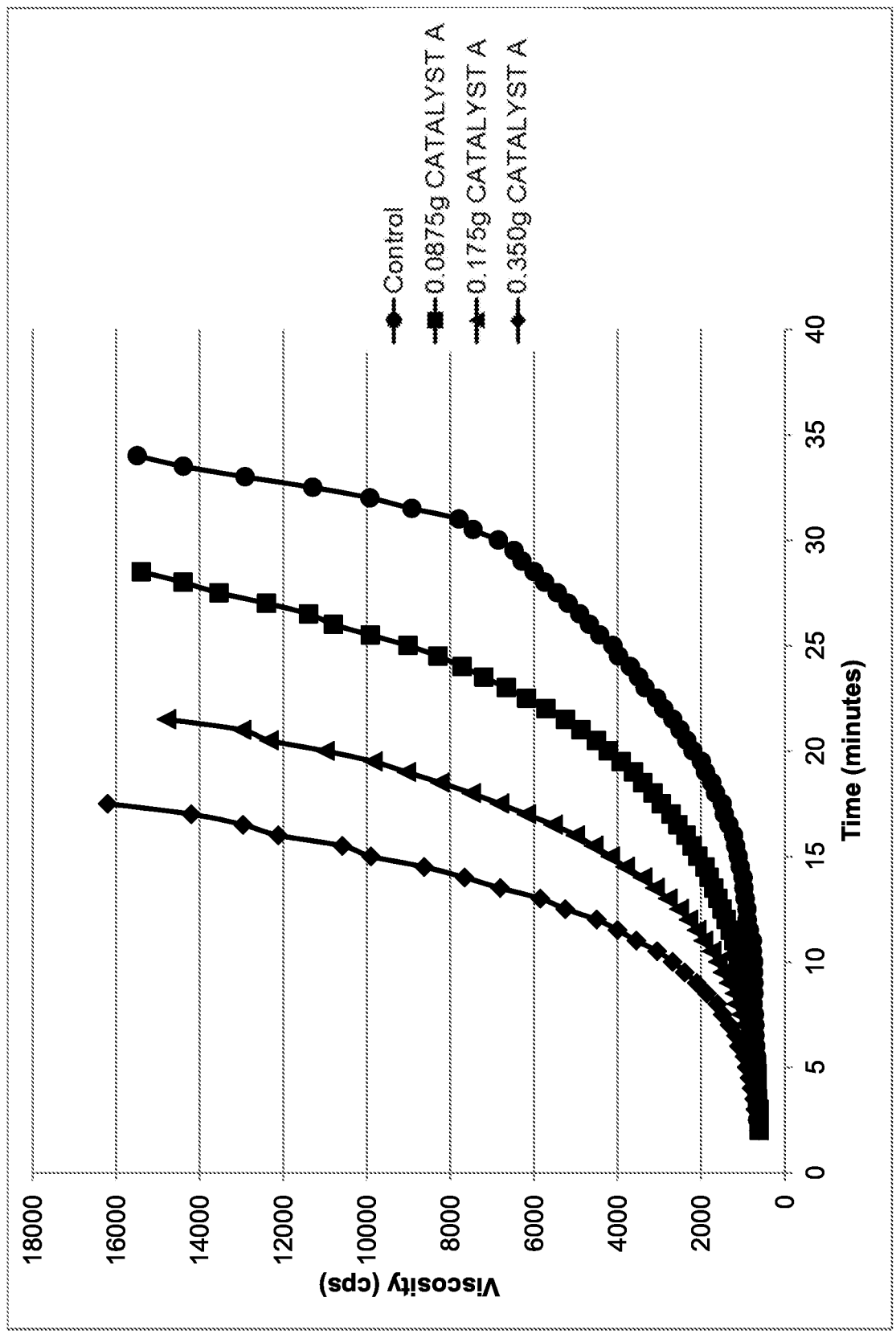
FIG. 1 shows the viscosity rise over time of formulations containing various levels of CATALYST A (methanol)

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In a first aspect, the present invention is directed to polyaspartic composition comprising a reaction product of a polyamine and a Michael addition receptor reacted in the presence of a catalyst comprising a phenolic compound, with the proviso that the phenolic compound is not a phenol which is substituted with tert-butyl groups in both ortho positions to the oxygen.

In a second aspect, the present invention is directed to polyurea compositions comprising a reaction product of a polyisocyanate and the inventive polyaspartic composition.

In a third aspect, the present invention is directed to a method of making a polyaspartic composition comprising reacting a polyamine with a Michael addition receptor in the presence of a catalyst comprising a phenolic compound, with the proviso that the phenolic compound is not a phenol which is substituted with tert-butyl groups in both ortho positions to the oxygen.

In a fourth aspect, the present invention is directed to one of a coating composition, an adhesive composition, a sealant composition, a composite composition, a casting composition, and a film composition comprising the inventive polyurea composition.

As used herein, the term "polymer" encompasses prepolymers, oligomers and both homopolymers and copolymers; the prefix "poly" in this context referring to two or more. As used herein, the term "molecular weight", when used in reference to a polymer, refers to the number average molecular weight, unless otherwise specified.

As used herein, the term "coating composition" refers to a mixture of chemical components that will cure and form a coating when applied to a substrate.

The terms "adhesive" or "adhesive composition", refers to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

A "sealant" or "sealant composition" refers to a composition which may be applied to one or more surfaces to form a protective barrier, for example to prevent ingress or egress of solid, liquid or gaseous material or alternatively to allow selective permeability through the barrier to gas and liquid. In particular, it may provide a seal between surfaces.

A "casting" or "casting composition" refers to a mixture of liquid chemical components which is usually poured into a mold containing a hollow cavity of the desired shape, and then allowed to solidify.

A "composite" or "composite composition" refers to a material made from one or more polymers, containing at least one other type of material (e.g., a fiber) which retains its identity while contributing desirable properties to the composite. A composite has different properties from those of the individual polymers/materials which make it up.

"Cured," "cured composition" or "cured compound" refers to components and mixtures obtained from reactive curable original compound(s) or mixture(s) thereof which have undergone chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is(are) not cured.

As used herein, the term "pot life" refers to the period of time from the initial mixture of two or more mutually reactive components of a coating system to the point at which the resulting coating composition exhibits a non-workable viscosity.

As used herein, the term "cure time" refers to the time to achieve Stage D (Method B) as defined in ASTM D5895-03 (2008)—*Standard Test Methods for Evaluating Drying or Curing During Film Formation of Organic Coatings Using Mechanical Recorder*.

As used herein, the term "polyurethane" refers to polymeric or oligomeric materials comprising urethane groups, urea groups, or both. Accordingly, as used herein, the term "polyurethane" is synonymous with the terms polyurea, polyurethane/urea, and modifications thereof. The term "polyurethane" also refers to crosslinked polymer networks in which the crosslinks comprise urethane and/or urea linkages, and/or the constituent polymer chains comprise urethane and/or urea linkages. Carbodiimide crosslinking as is known to those skilled in the art is also contemplated in the coatings of the invention.

The coating compositions described in this Specification may comprise a two-component coating composition. As used herein, the term "two-component" refers to a coating or coating composition comprising at least two components that must be stored in separate containers because of their mutual reactivity. For instance, two-component polyurea coating systems and compositions may comprise a hardener/crosslinker component comprising an isocyanate-functional compound, and a separate binder component comprising an amino-functional compound. The two separate components are generally not mixed until shortly before application because of the limited pot life of the mixture. When the two separate components are mixed and applied as a film on a substrate, the mutually reactive compounds in the two components react to crosslink and form a cured coating film.

As used herein, the term "polyamine" refers to compounds comprising at least two free primary and/or secondary amine groups. Polyamines include polymers comprising at least two pendant and/or terminal amine groups.

As used herein, the term "polyisocyanate" refers to compounds comprising at least two un-reacted isocyanate groups. Polyisocyanates include diisocyanates and diisocyanate reaction products comprising, for example, biuret, isocyanurate, uretdione, urethane, urea, iminooxadiazine dione, oxadiazine dione, carbodiimide, acyl urea, allophanate groups, and combinations of any thereof.

The polyisocyanate useful in the present invention may comprise any organic polyisocyanate having aliphatically, cycloaliphatically, araliphatically, and/or aromatically bound free isocyanate groups, which are liquid at room temperature or are dispersed in a solvent or solvent mixture at room temperature. In various non-limiting embodiments, the polyisocyanate may have a viscosity of from 10-15,000 mPas at 23° C., 10-5,000 mPas at 23° C., or 50-1,000 mPas at 23° C. In certain embodiments, the polyisocyanate may comprise polyisocyanates or polyisocyanate mixtures having exclusively aliphatically and/or cycloaliphatically bound isocyanate groups with an (average) NCO functionality of 2.0-5.0 and a viscosity of from 10-5,000 mPas at 23° C., 50-1,000 mPas at 23° C., or 100-1,000 mPas at 23° C.

In various embodiments, the polyisocyanate may comprise polyisocyanates or polyisocyanate mixtures based on one or more aliphatic or cycloaliphatic diisocyanates, such as, for example, ethylene diisocyanate; 1,4-tetramethylene diisocyanate; 1,6-hexamethylene diisocyanate (HDI); 2,2,4-trimethyl-1,6-hexamethylene diisocyanate; 1,12-dodecamethylene diisocyanate; 1-isocyanato-3-isocyanatomethyl-3,5,5-trimethyl-cyclohexane (isophorone diisocyanate or IPDI); bis-(4-isocyanato-3cyclohexyl)methane ($H_{12}$MDI); cyclohexane 1,4-diisocyanate; bis-(4-isocyanato-3-methyl-cyclohexyl)methane; PDI (pentane diisocyanate-bio-based) isomers of any thereof; or combinations of any thereof. In various embodiments, the polyisocyanate component may comprise polyisocyanates or polyisocyanate mixtures based on one or more aromatic diisocyanates, such as, for example, benzene diisocyanate; toluene diisocyanate (TDI); diphenylmethane diisocyanate (MDI); isomers of any thereof; or combinations of any thereof. In various embodiments, the polyisocyanate component may comprise a triisocyanate, such as, for example, 4-isocyanatomethyl-1,8-octane diisocyanate (triisocyanatononane or TIN); isomers thereof; or derivatives thereof.

Additional polyisocyanates (including various diisocyanates) that may also be included in the polyurea compositions of the present invention may include the polyisocyanates described in U.S. Pat. Nos. 5,075,370; 5,304,400; 5,252,696; 5,750,613; and 7,205,356. Combinations of any of the above-identified polyisocyanates may also be used.

The di- and tri-isocyanates indicated may be used as such, or as derivative polyisocyanates comprising biuret, isocyanurate, uretdione, urethane, urea, iminooxadiazine dione, oxadiazine trione, carbodiimide, acyl urea, and/or allophanate groups. In various non-limiting embodiments, derivative polyisocyanates comprising biuret, isocyanurate, uretdione, urethane, iminooxadiazine dione, oxadiazine trione, carbodiimide, acyl urea, and/or allophanate groups are included in the polyurea. In various embodiments, the polyisocyanate component comprises one or more of the above-identified structural groups prepared from IPDI, HDI, $H_{12}$MDI, and/or cyclohexane 1,4-diisocyanate.

The polyisocyanate may be hydrophilically-modified to be water-dispersible. Hydrophilically-modified water-dispersible polyisocyanates are obtainable, for example, by covalent modification with an internal emulsifier comprising anionic, cationic, or nonionic groups.

Polyether urethane type water-dispersible polyisocyanates may be formed, for example, from a reaction between polyisocyanates and less than stoichiometric amounts of monohydric polyalkylene oxide polyether alcohols. The preparation of such hydrophilically-modified polyisocyanates is described, for example, in U.S. Pat. No. 5,252,696. Polyether allophanate type water-dispersible polyisocyanates may be formed, for example, from a reaction between a polyalkylene oxide polyether alcohol and two polyisocyanate molecules under allophanation conditions. The preparation of such hydrophilically-modified polyisocyanates is described, for example, in U.S. Pat. No. 6,426,414. The polyalkylene oxide polyether alcohol used to prepare polyether type hydrophilically-modified water-dispersible polyisocyanates may comprise, for example, polyethylene oxide residues and/or polypropylene oxide residues.

Polyisocyanates may also be covalently modified with ionic or potentially ionic internal emulsifying groups to form hydrophilically-modified water-dispersible polyisocyanates. The ionic or potentially ionic groups may be cationic or anionic. As used herein, the term "ionic or potentially ionic group" refers to a chemical group that is nonionic under certain conditions and ionic under certain other conditions.

For example, in various embodiments, the ionic group or potentially ionic group may comprise a carboxylic acid group; a carboxylate group; a sulfonic acid group; a sulfonate group; a phosphonic acid group; a phosphonate group; or combinations of any thereof. In this regard, for example, carboxylic acid groups, sulfonic acid groups, and phosphonic acid groups are potentially ionic groups, whereas, carboxylate groups, sulfonate groups, and phosphonate groups are ionic groups in the form of a salt, such as, for example, a sodium salt.

For example, carboxylate (carboxylic acid) groups, sulfonate (sulfonic acid) groups, or phosphonate (phosphonic acid) groups may be covalently introduced into polyisocyanates to form hydrophilically-modified water-dispersible polyisocyanates. The ionic or potentially ionic groups may be introduced through a reaction between the isocyanate groups of the polyisocyanate and less than stoichiometric amounts of amino-functional or hydroxy-functional carboxylic acids, sulfonic acids, phosphonic acids, or salts thereof. Examples include, but are not limited to dimethylolpropionic acid (DMPA), N-(2-aminoethyl)-2-aminoethane sulfonic acid (AAS); N-(2-aminoethyl)-2-aminopropionic acid; 2-(cyclohexyl-amino)-ethane sulfonic acid; 3-(cyclohexyl-amino)-1-propane sulfonic acid (CAPS); 2-aminoethylphosphonic acid; or the salts thereof.

If free carboxylic acids, sulfonic acids, or phosphonic acids are incorporated in the polyisocyanate, then the acids may be neutralized with a neutralizing agent, such as, for example, tertiary amines, including, but not limited to, trialkyl-substituted tertiary amines. The preparation of hydrophilically-modified water-dispersible polyisocyanates is described, for example, in U.S. Pat. No. 6,767,958. Water-dispersible polyisocyanate mixtures based on triisocyanatononane (TIN) are described in International Patent Application Publication No. WO01/62819.

The NCO content of nonionic type hydrophilically-modified water-dispersible polyisocyanates may be from 5 to 25 weight percent of the polyisocyanate molecule. The NCO content of ionic type hydrophilically-modified water-dispersible polyisocyanates may be from 4 to 26 weight percent of the polyisocyanate molecule.

As those skilled in the art are aware, a polyaspartic ester may be produced by reacting a polyamine with a Michael addition receptor, i.e., an electron withdrawing group such as cyano, keto or ester (an electrophile) in a Michael addition reaction. Examples of suitable Michael addition receptors include, but are not limited to, acrylates, and diesters such as dimethyl maleate, diethyl maleate, dibutyl maleate, dimethyl fumarate, diethyl fumarate, and dibutyl fumarate.

The polyaspartic composition may include one or more polyaspartic esters corresponding to formula (I):

(I)

wherein:
n is an integer of 2 to 4
X represents an aliphatic residue;
$R^1$ and $R^2$ independently of each other represent organic groups that are inert to isocyanate groups under reaction conditions; and
n is at least 2.

In formula (I), the aliphatic residue X may correspond to a straight or branched alkyl and/or cycloalkyl residue of an n-valent polyamine that is reacted with a dialkylmaleate in a Michael addition reaction to produce a polyaspartic ester. For example, the residue X may correspond to an aliphatic residue from an n-valent polyamine including, but not limited to, ethylene diamine; 1,2-diaminopropane; 1,4-diaminobutane; 1,6-diaminohexane; 2,5-diamino-2,5-dimethylhexane; 2,2,4- and/or 2,4,4-trimethyl-1,6-diaminohexane; 1,11-diaminoundecane; 1,12-diaminododecane; 1-amino-3,3,5-trimethyl-5-amino-methylcyclohexane; 2,4'- and/or 4,4'-diaminodicyclohexylmethane; 3,3'-dimethyl-4,4'-diaminodicyclohexylmethane; 2,4,4'-triamino-5-methyldicyclohexylmethane; polyether polyamines with aliphatically bound primary amino groups and having a number average molecular weight ($M_n$) of 148 to 6000 g/mol; isomers of any thereof, and combinations of any thereof.

In various embodiments, the residue X may be obtained from 1,4-diaminobutane; 1,6-diaminohexane; 2,2,4- and/or 2,4,4-trimethyl-1,6-diaminohexane; 1-amino-3,3,5-trimethyl-5-aminomethylcyclohexane; 4,4'-diaminodicyclohexylmethane; 3,3'-dimethyl-4,4'-diaminodicyclohexylmethane; or 1,5-diamine-2-methyl-pentane.

Polyamines useful in the invention may include amine-terminated polyether polyols (i.e., polyether polyamines), such as primary and secondary amine-terminated polyether polyols of greater than 1,500 average molecular weight having in various embodiments, from about 2 to about 6 functionality, in certain embodiments, from about 2 to about 3, and an amine equivalent weight of from about 750 to about 4,000. In some embodiments, mixtures of amine-terminated polyethers may be used. In certain embodiments, the amine-terminated polyethers have an average molecular weight of at least about 2,500. These materials may be made by various methods known in the art.

The amine-terminated polyethers useful in this invention are, for example, polyethers made from an appropriate initiator to which lower alkylene oxides, such as ethylene oxide, propylene oxide, butylene oxide, or mixtures thereof, are added with the resulting hydroxyl terminated polyol then being aminated. When two or more oxides are used, they may be present as random mixtures or as blocks of one or the other polyether. In the amination step, it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in some embodiments, the amine-terminated polyethers have greater than 50 percent of their active hydrogens in the form of amine hydrogens. If ethylene oxide is used, it is desirable to cap the hydroxyl terminated polyol with a small amount of higher alkylene oxide to insure that the terminal hydroxyl groups are essentially all secondary hydroxyl groups. The polyols so prepared are then reductively aminated by known techniques, for example, as described in U.S. Pat. No. 3,654,370.

In some embodiments of the invention, a single high molecular weight amine-terminated polyol may be used. Also, mixtures of high molecular weight amine-terminated polyols, such as mixtures of di- and trifunctional materials and/or different molecular weight or different chemical composition materials, may be used.

Also, high molecular weight amine-terminated polyethers or simply polyether amines are included within the scope of this invention and may be used alone or in combination with the aforementioned polyols. The term "high molecular weight" is intended to include polyether amines having a molecular weight of at least about 2,000. Particularly preferred are the JEFFAMINE series of polyether amines available from Texaco Chemical Company; they include JEFFAMINE D-2000, JEFFAMINE D-4000, JEFFAMINE T-3000 and JEFFAMINE T-5000.

The phrase "inert to isocyanate groups under reaction conditions," which is used to define groups $R^1$ and $R^2$ in formula (I), means that these groups do not have Zerevitinov-active hydrogens. Zerevitinov-active hydrogen is defined in Rompp's *Chemical Dictionary* (Rommp Chemie Lexikon), $10^{th}$ ed., Georg Thieme Verlag Stuttgart, 1996. Generally, groups with Zerevitinov-active hydrogen are understood in the art to mean hydroxyl (OH), amino ($NH_x$), and thiol (SH) groups. In various embodiments, $R^1$ and $R^2$, independently of one another, are $C_1$ to $C_{10}$ alkyl residues, such as, for example, methyl, ethyl, or butyl residues.

In various embodiments, the polyaspartic composition comprises one or more compounds corresponding to formula (I) in which n is an integer from 2 to 6, in some embodiments from 2 to 4, and in some embodiments 2. In embodiments, where n=2, the polyaspartic composition may comprise one or more compounds corresponding to formula (II):

The polyaspartic composition may be produced by reacting the corresponding primary polyamines of the formula:

with a diester of the formula:

The production of the inventive polyaspartic composition from the above-mentioned polyamine and Michael addition receptor starting materials may take place within a temperature range of 0° C. to 100° C., in certain embodiments, the temperature is no greater than 45° C.

The catalysts suitable for producing the inventive polyaspartic compositions comprise phenolic compounds other than sterically hindered phenols which are substituted with tert-butyl groups in both ortho positions to the oxygen. Such compounds have at least one hydroxy group attached to a carbon atom of a benzene ring. Examples of phenolic compounds useful as catalysts in the present invention include, but are not limited to, phenol, catechol, 1,4-benzenediol, cashew nut oil (anacardic acids, cardol, and cardanol), phenolic aldehydes (vanillin, 2-methoxy phenol), resorcinol, tris-2,4,6-(dimethyl aminomethyl)phenol, 4-ethylresorcinol, 2,5-dimethylresorcinol, phloroglucinol, 2-nitrophloro-glucinol, 5-methoxyresorcinol, orcinol, 2-methylresorcinol, 4-bromoresorcinol, 4-chlororesorcinol, 4,6-dichlororesorcinol, 3,5-dihydroxy-benzaldehyde, 2,4-dihydroxy-benzaldehyde, methyl 3,5-dihydroxy benzoate, methyl 2,4-dihydroxybenzoate, 1,2,4-benzenetriol, pyrogallol, 3,5-dihydroxybenzyl alcohol, 2',6'-dihydroxyacetophenone, 2',4'-dihydroxyacetophenone, 3',5'-dihydroxyacetophenone, 2',4'-dihydroxy-propiophenone, 2',4'-dihydroxy-3'-methylacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 2-nitroresorcinol, 1,3-dihydroxynaphthalene, hydroquinone, methylhydroquinone, 2,3-dimethylhydroquinone, 2-methoxyhydroquinone, chlorohydroquinone, 2',5'-dihydroxyacetophenone, 2-isopropyl-1,4-benzenediol, 2,5-dihydroxybenzoic acid, 2,3-dicyanohydroquinone, 1,4-dihydroxynaphthalene, 2',5'-dihydroxypropiophenone, 1-(2,5-dihydroxy-4-methylphenyl)ethanone, tert-butylhydroquinone, methyl 2,5-dihydroxybenzoate, (2,5-dihydroxyphenyl)acetic acid, 2,4,5-trihydroxybenzoic acid, 4,7-dihydroxy-3-methyl-1-indanone, 2,5-dichlorohydroquinone, tetrafluoro-hydroquinone, ethyl 2,5-dihydroxybenzoate, 2-(2,5-dihydroxybenzylidene)malononitrile, 2-bromo-1,4-benzenediol, ethyl(2,5-dihydroxyphenyl)acetate, 1-(2,4,5-trihydroxyphenyl)-1-butanone, methyl 2,5-dihydroxy-4-methoxybenzoate, 2,6-dinitro-1,4-benzenediol, 2,4,5-trihydroxyphenylalanine, (2,5-dihydroxyphenyl)-(phenyl)methanone, 2,5-ditert-butyl-1,4-benzenediol, 2-(6-methylheptyl)-1,4-benzenediol, 2-(1,1,3,3-tetramethylbutyl)-1,4-benzenediol, dimethyl 2,5-dihydroxyterephthalate, 2,4,5-trichloro-3,6-dihydroxybenzonitrile, 2,5-ditert-pentyl-1,4-benzenediol, 2,5-dibromo-1,4-benzenediol, dimethyl 2,4-diethyl-3,6-dihydroxy-phenylphosphonate, pyrocatechol, 2,3-naphthalenediol, 5-methyl-1,2,3-benzenetriol, 4-methylcatechol, 3-methylcatechol, 3-fluorocatechol, 3-methoxycatechol, 4-chlorocatechol, 4,5-dichlorocatechol, 4-tert-butylcatechol, 3,4,5,6-tetrachloro-1,2-benzenediol, 3-isopropyl-6-methylcatechol, 3-tert-butyl-6-methylcatechol, 3,4-dihydroxybenzonitrile, 3,5-ditert-butylcatechol, 3,5-diisopropylcatechol, 3,4-dihydroxybenzaldehyde, 4-(1,1,3,3-tetramethylbutyl)-1,2-benzenediol, 4-(1,2-dihydroxyethyl)-1,2-benzenediol, 1-(3,4-dihydroxyphenyl)ethanone, 3,4-dihydroxybenzoic acid, 3,4,5-trihydroxybenzamide, 4-nitro-1,2-benzenediol, 4-(2-amino-1-hydroxyethyl)-1,2-benzenediol, 5-methyl-3-(1,1,3,3-tetramethylbutyl)-1,2-benzenediol, (3,4-dihydroxyphenyl)acetic acid, 2-(3,4-dihydroxybenzyl-idene)malononitrile, 3,5-dinitro-1,2-benzenediol, methyl 3,4-dihydroxybenzoate, 2-chloro-1-(3,4-dihydroxyphenyl)ethanone, phenyl(2,3,4-trihydroxyphenyl)methanone, isopropyl 3,4,5-trihydroxybenzoate, 3,4-dihydroxy-2-methylphenylalanine, 3-bromo-4,5-dihydroxybenzoic acid, 2-(3,4-dihydroxy-5-methoxybenzylidene)malononitrile, ethyl 3-(3,4-dihydroxyphenyl)propanoate, 2-phenyl-1-(2,3,4-trihydroxy-phenyl)ethanone, and 3,4,5-trihydroxy-N-(2-hydroxyethyl)benzamide.

In various embodiments, the phenolic catalysts may be used in the coating, adhesive, sealant, composite, casting, and film formulations in amount ranging from 1 ppm to 12,000 ppm, in certain embodiments from 10 ppm to 500 ppm and in selected embodiments from 20 ppm to 200 ppm.

As mentioned herein, the inventive polyaspartic compositions may be combined with a polyisocyanate to produce polyurea compositions. The inventive polyurea compositions may be applied to a substrate in the form of a coating composition by conventional methods such as painting, rolling, pouring or spraying. Suitable substrates include, but are not limited to, metals, plastics, wood, cement, concrete and glass. The substrates to be coated by the polyurea coating composition according to the invention optionally may be treated with suitable primers.

The inventive coatings, adhesives, sealants, composites, castings, and films optionally may contain additives such as fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators, and extenders.

Although the present invention is described and exemplified in the instant Specification in the context of a polyurea coating composition, the invention is not intended to be so limited. The principles of the invention are equally applicable to polyurethane, polyurea, polyurethane/urea coatings, adhesives, sealants, composites, castings, and films.

EXAMPLES

The non-limiting and non-exhaustive examples that follow are intended to further describe various non-limiting and non-exhaustive embodiments without restricting the scope of the embodiments described in this specification.

The following materials were used in preparation of the Examples. All quantities given in "parts" and "percents" are understood to be by weight, unless otherwise indicated.

POLYASPARTIC A a 100% solids content aspartic ester functional amine, having an amine number of approx. 191 mg KOH/g, viscosity @ 25° C. of 1400 mPa·s, commercially available from Covestro as DESMOPHEN NH 1520;

POLYASPARTIC B a 100% solids content aspartic ester functional amine, having an amine number of approx. 201 mgKOH/g, viscosity @ 25° C. of 1450 mPa·s, commercially available from Covestro as DESMOPHEN NH 1420;

POLYASPARTIC C a 100% solids content aspartic ester functional amine, having an amine number of approx. 190 mg KOH/g, viscosity @ 25° C. of 100 mPa·s commercially available from Covestro as DESMOPHEN NH 2850 XP;

ISOCYANATE A an aliphatic polyisocyanate resin based on hexamethylene diisocyanate, NCO content 23.5±0.5%, viscosity 730±100 mPa·s @ 23° C., commercially available from Covestro as DESMODUR N3900;

ADDITIVE A t-butyl acetate, commercially available from Aldrich

Figure 2:
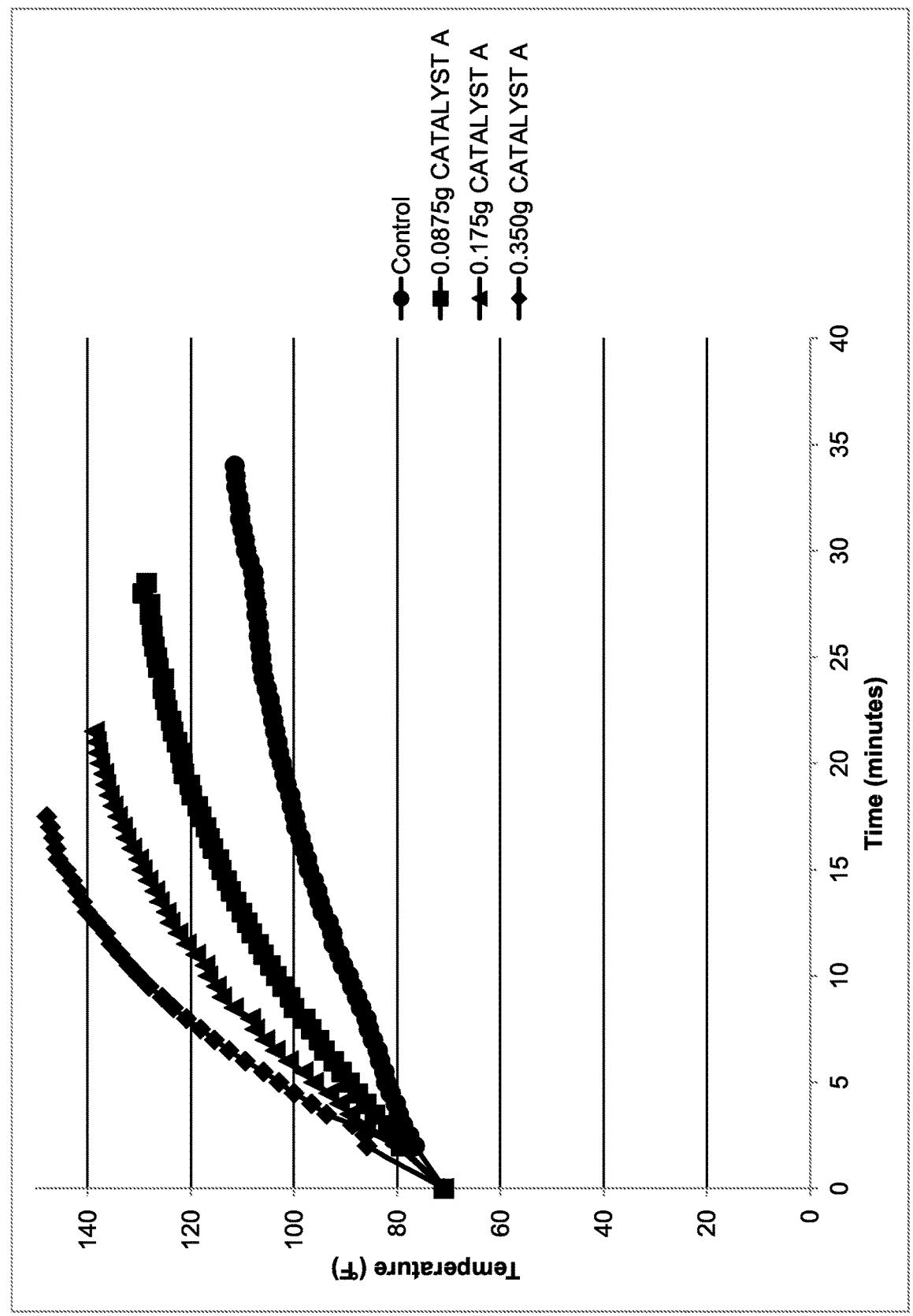
FIG. 2 illustrates the temperature rise over time of formulations containing various levels of CATALYST A (methanol)

ADDITIVE B a flow promoter and de-arerator, commercially available from OMG Americas, Inc. as BORCHI GOL 0011:

CATALYST A methanol, analytical grade, commercially available from Aldrich;

CATALYST B 1-pentanol, commercially available from Aldrich;

CATALYST C nonylphenol, commercially available from Aldrich;

CATALYST D 2-propanol, commercially available from Fisher Scientific;

CATALYST E t-butanol, commercially available from Acros Organics;

CATALYST F benzene-1,3-diol, (resorcinol) commercially available from Aldrich;

CATALYST G a sterically hindered phenolic antioxidant, commercially available from BASF as IRGANOX 1135;

CATALYST H 4-tertbutyl phenol, commercially available from Aldrich;

CATALYST I 2-tertbutyl phenol, commercially available from Aldrich;

CATALYST J 2,4-ditertbutyl phenol, commercially available from Aldrich;

CATALYST K 2,6-dimethyl phenol, commercially available from Aldrich;
CATALYST L 4-methoxy phenol, commercially available from Acros Organics;
CATALYST M vanillin, commercially available from Aldrich;
CATALYST N hydroxyl vanillin, commercially available from Aldrich;
CATALYST O an ultra-high purity 3-pentadeca-dienyl-phenol, commercially available from Cardolite Corp. as CARDOLITE NX 2026;
CATALYST P 2-methoxy phenol, commercially available from Aldrich;

Experiments were conducted to determine whether the reactivity of POLYASPARTIC A could be increased with an alkanol catalyst. Table 1 provides formulations with increasing amounts of CATALYST A (methanol). The viscosity and temperature data are presented in FIG. 1 and FIG. 2, respectively. As can be appreciated by reference to FIG. 1 and FIG. 2, increasing the quantity of CATALYST A (methanol) increased the cure rate, which in turn increased the viscosity and the exotherm of the reaction.

TABLE I

| Component | Ex. I-A | Ex. I-B | Ex. I-C | Ex. I-D | Ex. I-E | Ex. I-F |
|---|---|---|---|---|---|---|
| POLY-ASPARTIC B | 88.05 | 88.05 | 88.05 | 88.05 | 88.05 | 88.05 |
| ADDITIVE A | 8.65 | 8.65 | 8.65 | 8.65 | 8.65 | 8.65 |
| CATALYST A | 0.0 | 0.0875 | 0.175 | 0.350 | 1.05 | 2.10 |
| ISO-CYANATE A | 78.29 | 78.29 | 78.29 | 78.29 | 78.29 | 78.29 |

Figure 3:
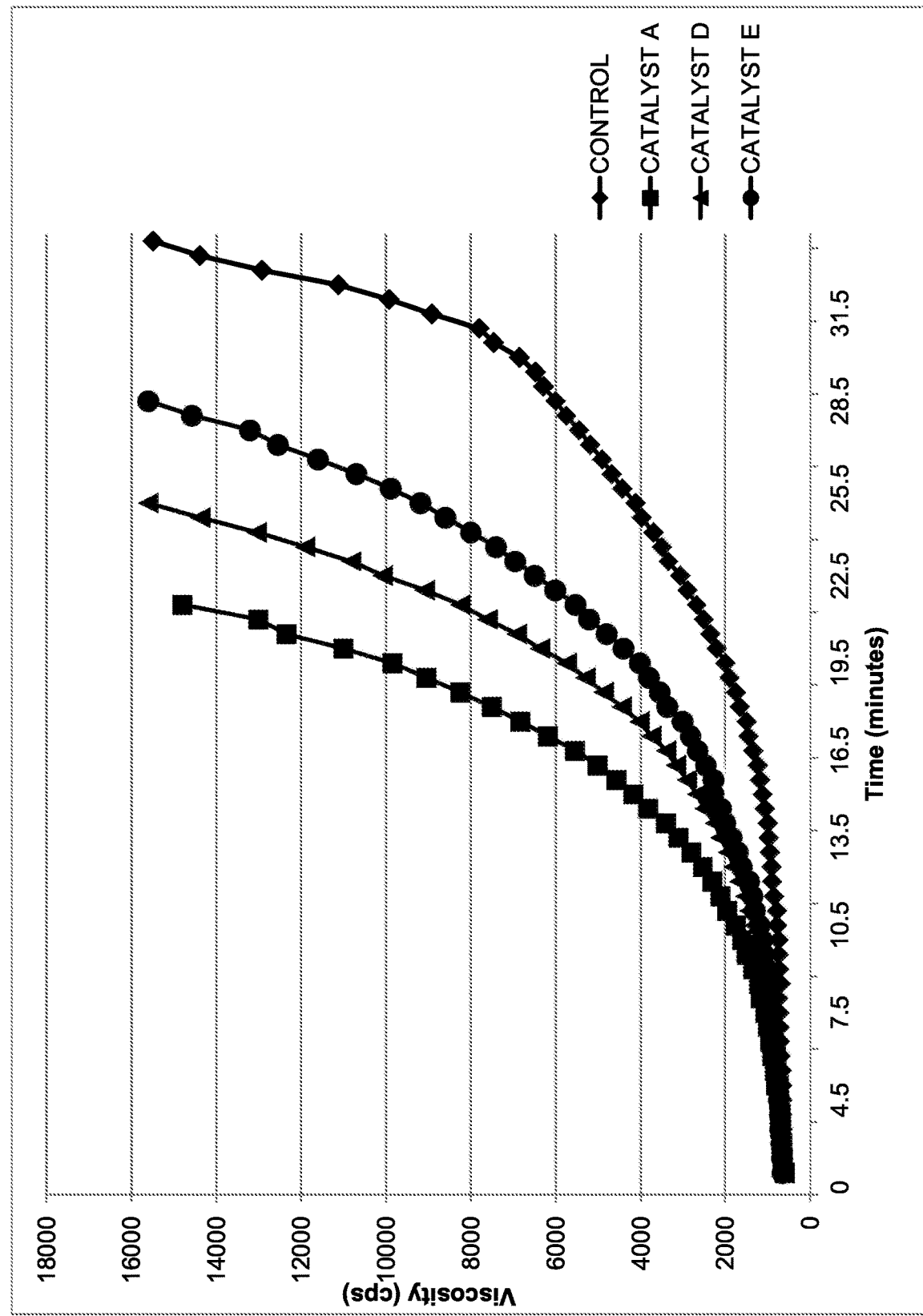
FIG. 3 shows the viscosity rise over time of formulations containing various alkanol compound as catalysts.
Figure 4:
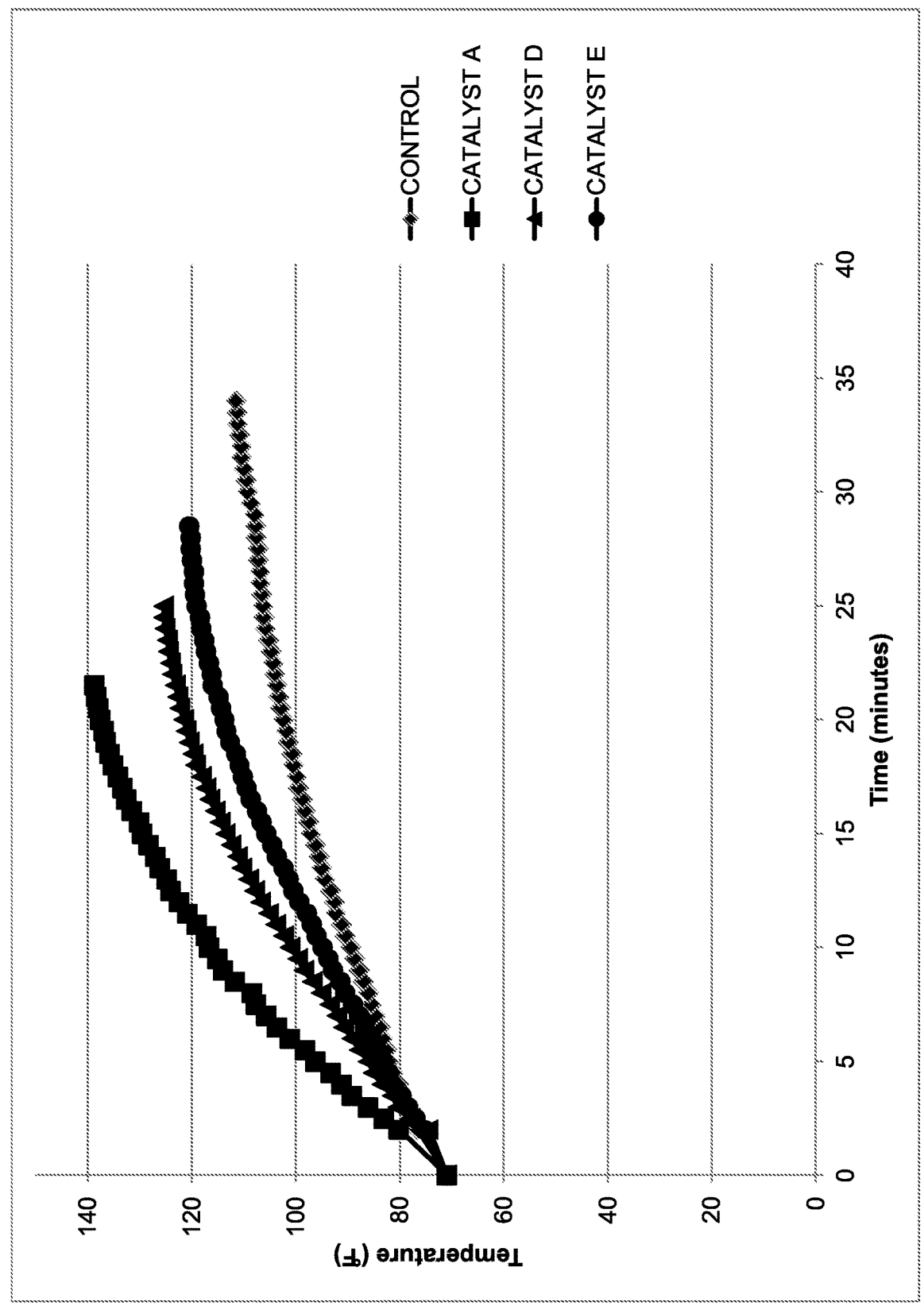
FIG. 4 shows the temperature rise over time of formulations containing various alkanol compound as catalysts.

Additional alkanols were examined for their catalytic effect. Primary alkanols appeared to be better catalysts than secondary alkanols, and these were better catalysts than tertiary alkanols. The formulations tested are given in Table II. Viscosity and reaction temperature data are provided in FIGS. 3 and 4 respectively.

TABLE II

| Component | Ex. II-A | Ex. II-B | Ex. II-C | Ex. II-D |
|---|---|---|---|---|
| POLYASPARTIC B | 88.05 | 88.05 | 88.05 | 88.05 |
| ADDITIVE A | 8.65 | 8.475 | 8.322 | 8.245 |
| CATALYST A | | 0.175 | | |
| CATALYST D | | | 0.328 | |
| CATALYST E | | | | 0.4048 |
| ISOCYANATE A | 78.29 | 78.29 | 78.29 | 78.29 |
| Moles OH | 0.0 | 0.00547 | 0.00547 | 0.00547 |

Figure 5:
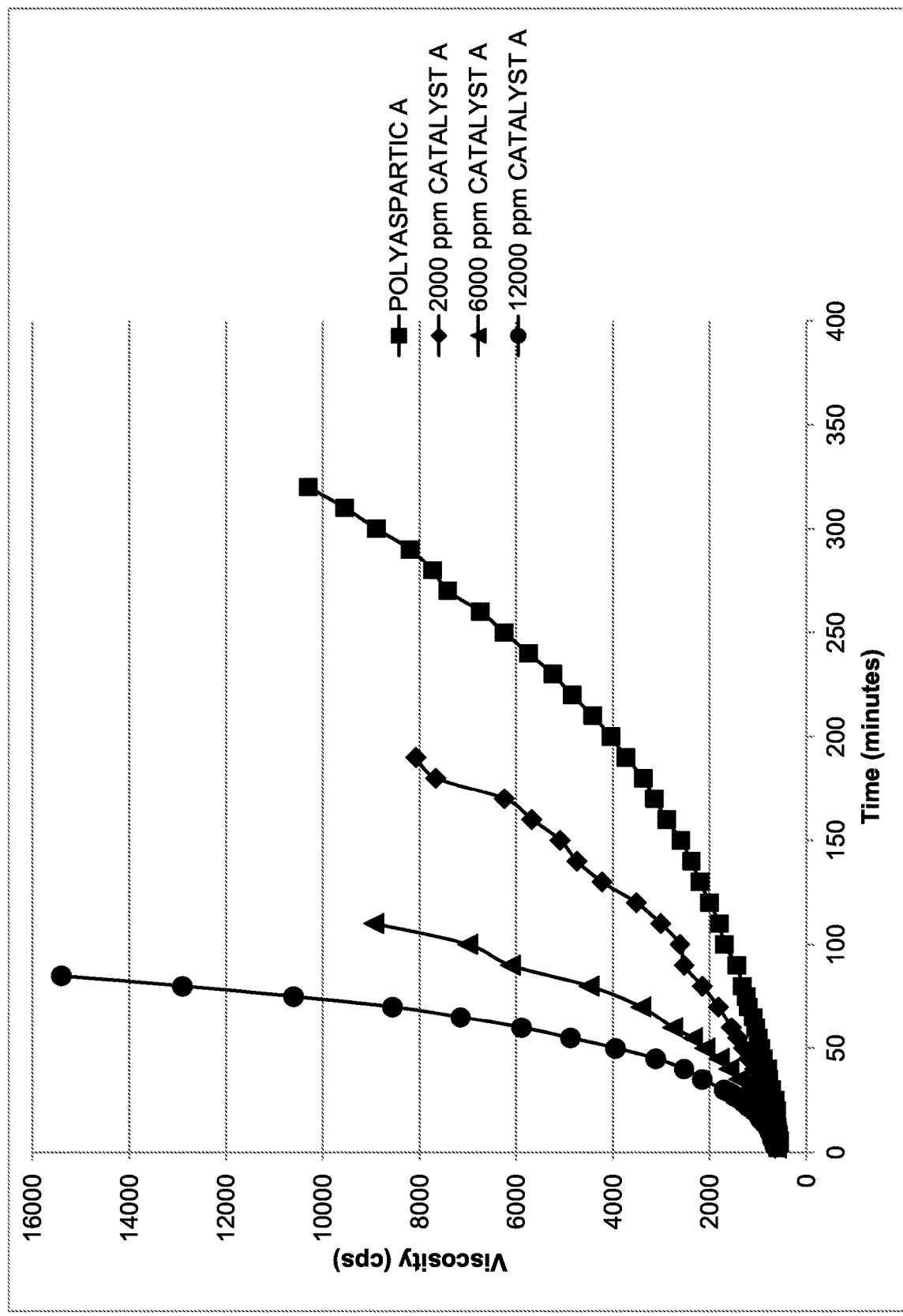
FIG. 5 is a plot of viscosity rise over time of formulations containing various amounts of CATALYST A (methanol) over time.

Attempts (Ex. 1-E and Ex. 1-F) were made to catalyze the reaction with extremely high amounts of CATALYST A (methanol). FIG. 5 shows a plot of viscosity rise of formulations containing CATALYST A (methanol) over time. As can be appreciated by reference to FIG. 5, at the highest levels of CATALYST A (methanol), the rate did not increase as quickly.

To determine if the coating reactivity was in an acceptable range, work time and walk-on time were evaluated. Work time for the 6000 ppm CATALYST A (methanol) formulation was 50 minutes and walk-on time was greater than 26 hours. Work time for 12000 ppm CATALYST A (methanol) formulation was 25 minutes and walk-on time was greater than 19 hours. Lower Index formulations were carried out in Table III.

Due to the high volatility of CATALYST A (methanol), experiments with another alkanol, CATALYST B (1-pentanol) were attempted. Unfortunately, the strong odor of CATALYST B (1-pentanol) resulted in its exclusion from use at higher levels.

Experiments with a stronger class of catalyst are summarized in Table III. As phenolic compounds have a higher pKa, they were expected to have a greater catalytic effect. CATALYST C (nonylphenol), CATALYST F (resorcinol), and CATALYST G (IRGANOX 1135) were evaluated. Although CATALYST C (nonylphenol) and CATALYST F (resorcinol) proved to be very active catalysts, CATALYST G (IRGANOX 1135), proved to be ineffective. Without wishing to be bound to any theory, the inventors speculate this was possibly due to the steric hindrance provided by the tert-butyl groups being in an ortho position to the oxygen of the phenol.

In Tables III, IV and V, "work time" was assessed by applying the formulation to a prepped MASONITE board with a roller. A strip was applied approximately 12.7 cm (5 in.) wide and 0.203 mm (8 mils) thick. Every five minutes, another 12.7 cm (5 in.) strip was applied overlapping the two coating edges. When the wet edges no longer blended together (as observed after cure), the end of the work time was reached. Or stated more succinctly, when the lap line flow back stopped and appeared as a line in the cured coating, the work time had been surpassed. Likewise, in Tables III, IV and V, "walk on time" was assessed by applying 0.203 mm (8 mils) of the coating onto a MASONITE board. A 91 KG (200 lb.) individual stepped onto the board at timed intervals. Each step was on an untested section of coating. Walk on time was achieved when no mark or impression was left on the coating after cure.

TABLE III

| Component | Ex. III-A | Ex. III-B | Ex. III-C | Ex. III-D | Ex. III-E | Ex. III-F | Ex. III-G | Ex. III-H | Ex. III-I | Ex. III-J |
|---|---|---|---|---|---|---|---|---|---|---|
| POLYASPARTIC A | 177.1 | 181.6 | 196.1 | 203 | 200.1 | 200.1 | 200.1 | 200.1 | 200.1 | 200.1 |
| ADDITIVE A | 15.68 | 15.68 | 15.68 | 15.68 | 4.32 | 11.8 | 11.8 | 6.4 | 17 | 18.2 |
| CATALYST A | 1.575 | 1.575 | 1.575 | 1.575 | | | | | | |
| CATALYST B | | | | | 13.0 | | | | | |
| CATALYST C | | | | | | 3.6 | 5.4 | 10.86 | | |
| CATALYST F | | | | | | | | | 0.9 | |
| CATALYST G | | | | | | | | | | 19.28 |
| ISOCYANATE A | 155.6 | 151.1 | 136.6 | 129.0 | 132.6 | 132.6 | 132.6 | 132.6 | 132.6 | 132 |
| NCO:OH | 1.44 | 1.37 | 1.14 | 1.05 | 1.09 | 1.09 | 1.09 | 1.09 | 0.99 | 1.07 |
| (incl. CATALYST) | (1.45) | (1.25) | (1.06) | (0.97) | (1.00) | (1.00) | (1.00) | (1.00) | | (1.00) |
| Work time (minutes) | 70 | 70 | 60 | 60 | 40 | 25 | 20 | <15 | 20 | >45 |
| Walk-on time (hours) | >24 | >24 | >10, <24 | >10, <24 | >8, <24 | >9, <13 | <16 | <20 | 13 | |
| Comment | | | @ 10 hrs tack free, indentable | | Strong odor | Close @ 9 hrs | | | | Soft @ 24 h |

As can be appreciated by reference to Table III, CATALYST C (nonylphenol) appeared to be a good choice for increasing the speed of the reaction; however, its use may be subject to restrictions in some countries. Therefore, a series of other substituted phenolic compounds were examined for their catalytic effect with the results being summarized in Table IV. Although many were suitable catalysts, a number of those phenolic compounds had intense odors. As an example, CATALYST P (2-methoxy phenol) was a notable catalyst but had an intense odor. As a result, the inventors narrowed their review to phenolic compounds which occur in nature or those which have a pleasant odor. Thus, CATALYST M (vanillin, a phenolic aldehyde) and CATALYST O (cashew nut oil, phenolic lipids) were evaluated. Although CATALYST M (vanillin) had a pleasant odor, it produced yellow films. CATALYST O (cashew nut oil) on the other hand, met both requirements as it occurs naturally and does not have a strong odor.

TABLE IV

| Component | Ex. IV-A | Ex. IV-B | Ex. IV-C | Ex. IV-D | Ex. IV-E | Ex. IV-F |
|---|---|---|---|---|---|---|
| POLYASPARTIC A | 200 | 200 | 200 | 200 | 200 | 200 |
| ADDITIVE A | 17 | 17 | 17 | 17 | 17 | 17 |
| CATALYST H | | | | 1.63 | | |
| CATALYST K | | | | | 1.33 | |
| CATALYST L | | | 1.35 | | | |
| CATALYST M | | | | | | 1.65 |
| CATALYST P | 1.35 | 2.05 | | | | |
| ISOCYANATE A | 132.6 | 132.6 | 132.6 | 132.6 | 132.6 | 132.6 |
| NCO:OH | 1.09 | 1.09 | 1.09 | 1.09 | 1.09 | 1.09 |
| Work time (minutes) | 25 | 15 | 35 | 30 | 25-30 | 20-25 |
| Walk-on time (hours) | <11, 8.5 | >5 but close | 16 | 16 | >12, <17, 14 | 8 |
| Comment | | odor | | | Best roll out | Yellow |
| Odor | Roasted coffee | Strong odor | Less odor | Less odor | Household cleaner | Vanilla |

| Component | Ex. IV-G | Ex. IV-H | Ex. IV-I | Ex. IV-J | Ex. IV-K | Ex. IV-L |
|---|---|---|---|---|---|---|
| POLYASPARTIC A | 200 | 200 | 200 | 200 | 200 | 200 |
| ADDITIVE A | 17 | 17 | 17.8 | 17 | 16.6 | 16.4 |
| CATALYST I | | | | 1.63 | 2.03 | |
| CATALYST J | | | | | | 2.24 |
| CATALYST N | | 1.65 | 0.82 | | | |
| CATALYST O | 3.25 | | | | | |
| CATALYST P | | | | | | |
| ISOCYANATE A | 132.6 | 132.6 | 132.6 | 132.6 | 132.6 | 132.6 |
| NCO:OH | 1.09 | 1.09 | 1.09 | 1.09 | 1.09 | 1.09 |
| Work time (minutes) | 20-25 | 15-20 | 25 | 30-35 | 20-25 | 30-35 |
| Walk-on time (hours) | 9 | 9 | — | 16 | 15.5 | 14 |
| Comment | | No color | No color | | | |
| Odor | | Low odor | Low odor | | | |

Experiments were carried out to determine whether addition of a small portion of POLYASPARTIC C would improve walk-on time. The results of those experiments are summarized in Table V. Thick plaques prepared from the formulations showed a subtle loss in properties on heating the plaques in the oven at 60° C. for a few hours. Tensile strength was determined according to ASTM D 412; percent elongation was determined according to ASTM D 412. Shore D hardness was determined with a Durometer according to ASTM D 2240.

TABLE V

| Component | Ex. V-A | Ex. V-B | Ex. V-C |
|---|---|---|---|
| POLYASPARTIC C | | 2.84 | 5.52 |
| POLYASPARTIC A | 58.84 | 54.00 | 52.51 |

TABLE V-continued

| Component | Ex. V-A | Ex. V-B | Ex. V-C |
|---|---|---|---|
| ADDITIVE A | 4.83 | 4.83 | 4.69 |
| CATALYST P | 0.38 | 0.38 | 1.35 |
| ADDITIVE B | 0.28 | 0.28 | 0.28 |
| ISOCYANATE A | 37.66 | 37.66 | 36.62 |
| NCO:OH | 1.07/1.06 | 1.07/1.06 | 1.02 |
| Work time (minutes) | 25 | 25 | 13 |
| Walk-on time (hours) | 8.5 | 8 | 6 |
| Hardness, Shore D | 72/70 | 74/72 | 73/72 |
| Tensile (psi) - plaque | 8033 | 7783 | 7430 |
| Elongation (%) - plaque | 5.2 | 4.7 | 5.2 |
| Hardness, Shore D, heated | 76/74 | 75/73 | 74/71 |
| Tensile - (psi) plaque - heated | 6020 | 5925 | 5388 |
| Elongation (%) plaque - heated | 6.65 | 6.3 | 14.3 |

Figure 6:
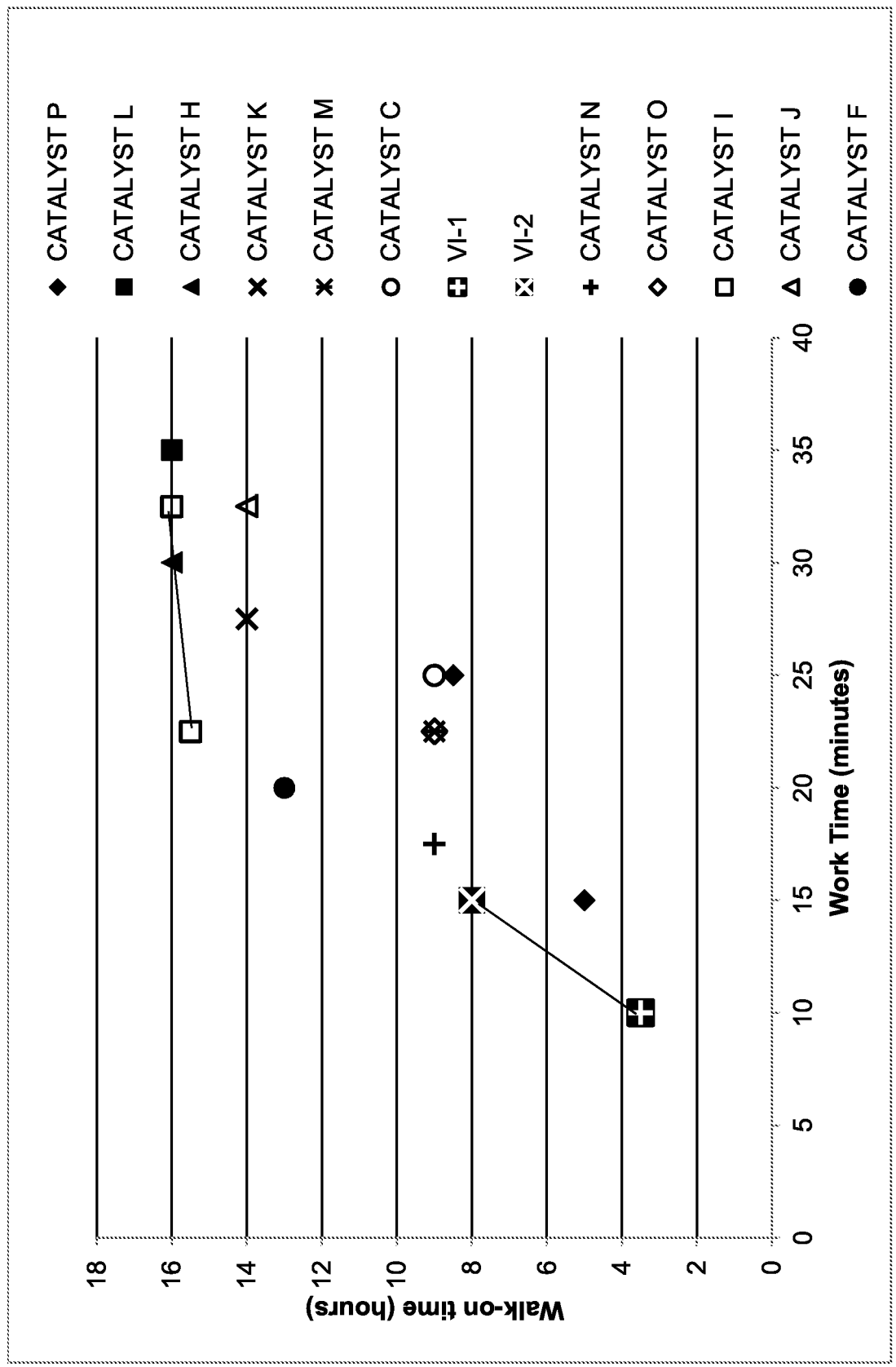
FIG. 6 is a comparison plot of walk-on time versus work time for formulations using a variety of phenolic compounds as catalysts.

FIG. 6 is a comparison of walk-on time versus work time for formulations using a variety of phenolic compound CATALYSTS to demonstrate which performed the best. Standard formulations, as shown in Table VI (i.e., VI-1 and VI-2), were also added to the plot to show improvements over the current technology. Most notably, CATALYST P (2-methoxy phenol), CATALYST C (nonylphenol), CATALYST O (cashew nut oil) and CATALYST M (vanillin) gave better results than the standard formulations (VI-1, VI-2).

TABLE VI

| Component | VI-1 | VI-2 |
|---|---|---|
| POLYASPARTIC A | 16.88 | 28.55 |
| POLYASPARTIC B | 22.66 | 14.28 |
| POLYASPARTIC C | 16.94 | 14.28 |
| ADDITIVE A | 5.02 | 4.97 |
| ADDITIVE B | 1.00 | 1.00 |
| ISOCYANATE A | 37.50 | 36.92 |

TABLE VI-continued

| Component | VI-1 | VI-2 |
|---|---|---|
| NCO:OH | 1.07 | 1.07 |
| Work time (minutes) | 10 | 15 |
| Walk-on time (hours) | 3.5 | 8 |

Various formulations were made to assess CATALYST O (cashew nut oil) by lowering the isocyanate index, by adding an additional polyaspartate, POLYASPARTIC C, and by adjusting the CATALYST O (cashew nut oil) level. As is apparent by reference to Table VII, formulations used in Ex. VII-C, VII-D and Ex. VII-G appeared to be improvements over the control, Ex. VII-A.

TABLE VII

| Component | Ex. VII-A | Ex. VII-B | Ex. VII-C | Ex. VII-D | Ex. VII-E | Ex. VII-F | Ex. VII-G |
|---|---|---|---|---|---|---|---|
| POLYASPARTIC A | 37.37 | 58.38 | 58.35 | 51.80 | 46.06 | 51.70 | 60.00 |
| POLYASPARTIC B | 20.10 | | | | | | |
| POLYASPARTIC C | | | | 5.75 | 11.5 | 5.74 | 0.0 |
| CATALYST O | | 0.95 | 0.97 | 0.97 | 0.97 | 1.17 | 0.97 |
| ADDITIVE A | 4.41 | 3.87 | 3.95 | 3.95 | 3.95 | 3.94 | 3.95 |
| ISOCYANATE A | 38.16 | 36.79 | 36.73 | 37.53 | 37.53 | 37.45 | 35.08 |
| NCO:OH | 1.07 | 1.01 | 1.00 | 1.04 | 1.04 | 1.03 | 0.93 |
| Work time (minutes) | 7.5 (70% RH) 10 (50% RH) | 22.5 (50% RH) | 25 | 25 | 20 | 17.5 | 20 |
| Walk-on time (hours) | 9 | 11 | 11 | 11.5 | 12.5 | 12 | 8.25 |

RH = Relative Humidity

This Specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this Specification. Thus, it is contemplated and understood that this Specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this Specification, and such amendments comply with the requirements of 35 U.S.C. § 112(a), and 35 U.S.C. § 132(a).

Various aspects of the subject matter described herein are set out in the following numbered Clauses:

Clause 1. A polyaspartic composition comprising a reaction product of a polyamine and a Michael addition receptor reacted in the presence of a catalyst comprising a phenolic compound, with the proviso that the phenolic compound is not a phenol which is substituted with tert-butyl groups in both ortho positions to the oxygen.

Clause 2. The polyaspartic composition according to Clause 1, wherein the polyamine is selected from ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotoluylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane, and amine-terminated polyether polyols.

Clause 3. The polyaspartic composition according to one of Clauses 1 and 2, wherein the Michael addition receptor is selected from the group consisting of dimethyl maleate, diethyl maleate, dibutyl maleate, dimethyl fumarate, diethyl fumarate, dibutyl fumarate, acrylates, and combinations thereof.

Clause 4. The polyaspartic composition according to any one of Clauses 1 to 3, wherein the phenolic compound is selected from the group consisting of phenols, phenolic aldehydes, alkylphenols, benzenediols, cashew nut oil, and combinations thereof.

Clause 5. The polyaspartic composition according to any one of Clauses 1 to 4, wherein the phenolic compound is selected from the group consisting of catechol, 1,4-benzenediol, resorcinol, tris-2,4,6-(dimethyl aminomethyl)phenol, 4-ethylresorcinol, 2,5-dimethylresorcinol, phloroglucinol, 2-nitrophloro-glucinol, 5-methoxyresorcinol, orcinol, 2-methylresorcinol, 4-bromoresorcinol, 4-chlororesorcinol, 4,6-dichlororesorcinol, 3,5-dihydroxy-benzaldehyde, 2,4-dihydroxy-benzaldehyde, methyl 3,5-dihydroxy benzoate, methyl 2,4-dihydroxybenzoate, 1,2,4-benzenetriol, pyrogallol, 3,5-dihydroxybenzyl alcohol, 2',6'-dihydroxyacetophenone, 2',4'-dihydroxyacetophenone, 3',5'-dihydroxyacetophenone, 2',4'-d dihydroxy-propiophenone, 2',4'-dihydroxy-3'-methylacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 2-nitroresorcinol, 1,3-dihydroxynaphthalene, hydroquinone, methylhydroquinone, 2,3-dimethylhydroquinone, 2-methoxyhydroquinone, chlorohydroquinone, 2',5'-dihydroxyacetophenone, 2-isopropyl-1,4-benzenediol, 2,5-dihydroxybenzoic acid, 2,3-dicyanohydroquinone, 1,4-dihydroxynaphthalene, 2',5'-dihydroxypropiophenone, 1-(2,5-dihydroxy-4-methylphenyl)ethanone, tert-butylhydroquinone, methyl 2,5-dihydroxybenzoate, (2,5-dihydroxyphenyl)acetic acid, 2,4,5-trihydroxybenzoic acid, 4,7-dihydroxy-3-methyl-1-indanone, 2,5-dichlorohydroquinone, tetrafluoro-hydroquinone, ethyl 2,5-dihydroxybenzoate, 2-(2,5-dihydroxybenzylidene)malononitrile, 2-bromo-1,4-benzenediol, ethyl(2,5-dihydroxyphenyl)acetate, 1-(2,4,5-trihydroxyphenyl)-1-butanone, methyl 2,5-dihydroxy-4-methoxybenzoate, 2,6-dinitro-1,4-benzenediol, 2,4,5-trihydroxyphenylalanine, (2,5-dihydroxyphenyl)-(phenyl) methanone, 2,5-ditert-butyl-1,4-benzenediol, 2-(6-methylheptyl)-1,4-benzenediol, 2-(1,1,3,3-tetramethylbutyl)-1,4-benzenediol, dimethyl 2,5- dihydroxyterephthalate, 2,4,5-trichloro-3,6-dihydroxybenzonitrile, 2,5-ditert-pentyl-1,4-benzenediol, 2,5-dibromo-1,4-benzenediol, dimethyl 2,4-diethyl-3,6-dihydroxyphenylphosphonate, pyrocatechol, 2,3-naphthalenediol, 5-methyl-1,2,3-benzenetriol, 4-methylcatechol, 3-methylcatechol, 3-fluorocatechol, 3-methoxycatechol, 4-chlorocatechol, 4,5-dichlorocatechol, 4-tert-butylcatechol, 3,4,5,6-tetrachloro-1,2-benzenediol, 3-isopropyl-6-methylcatechol, 3-tert-butyl-6-methylcatechol, 3,4-dihydroxybenzonitrile, 3,5-ditert-butylcatechol, 3,5-diisopropylcatechol, 3,4-dihydroxybenzaldehyde, 4-(1,1,3,3-tetramethylbutyl)-1,2-benzenediol, 4-(1,2-dihydroxyethyl)-1,2-benzenediol, 1-(3,4-dihydroxyphenyl)ethanone, 3,4-dihydroxybenzoic acid, 3,4,5-trihydroxybenzamide, 4-nitro-1,2-benzenediol, 4-(2-amino-1-hydroxyethyl)-1,2-benzenediol, 5-methyl-3-(1,1,3,3-tetramethylbutyl)-1,2-benzenediol, (3,4-dihydroxyphenyl)acetic acid, 2-(3,4-dihydroxybenzylidene)malononitrile, 3,5-dinitro-1,2-benzenediol, methyl 3,4-dihydroxybenzoate, 2-chloro-1-(3,4-dihydroxyphenyl)ethanone, phenyl(2,3,4-trihydroxyphenyl)methanone, isopropyl 3,4,5-trihydroxybenzoate, 3,4-dihydroxy-2-methylphenylalanine, 3-bromo-4,5-dihydroxybenzoic acid, 2-(3,4-dihydroxy-5-methoxybenzylidene)malononitrile, ethyl 3-(3,4-dihydroxyphenyl)propanoate, 2-phenyl-1-(2,3,4-trihydroxy-phenyl)ethanone, and 3,4,5-trihydroxy-N-(2-hydroxyethyl)benzamide.

Clause 6. A polyurea composition comprising a reaction product of a polyisocyanate and the polyaspartic composition according to any one of Clauses 1 to 5.

Clause 7. The polyurea composition according to Clause 6, wherein the polyisocyanate is selected from the group consisting of ethylene diisocyanate, 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), bis-(4-isocyanatocyclohexyl)methane ($H_{12}$MDI), cyclohexane 1,4-diisocyanate, bis-(4-isocyanato-3-methylcyclohexyl)methane, PDI (pentane diisocyanate-bio-based), benzene diisocyanate, toluene diisocyanate (TDI), diphenylmethane diisocyanate (MDI), 4-isocyanatomethyl-1,8-octane diisocyanate (triisocyanatononane or TIN), isomers of any thereof, and combinations of any thereof.

Clause 8. One of a coating composition, an adhesive composition, a sealant composition, a composite composition, a casting composition, and a film composition comprising the polyurea composition according to one of Clauses 6 and 7.

Clause 9. A coating composition comprising the polyurea composition according to one of Clauses 6 and 7.

Clause 10. The coating composition according to Clause 9 further including an additive selected from the group consisting of fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators, and extenders.

Clause 11. A substrate having applied thereto the coating composition according to one of Clauses 9 and 10.

Clause 12. The substrate according to Clause 11, wherein the substrate is selected from the group consisting of metal, plastic, wood, cement, concrete, and glass.

Clause 13. The substrate according to Clause 11, wherein the substrate is a floor.

Clause 14. A method of making a polyaspartic composition comprising reacting a polyamine and a Michael addition receptor in the presence of a catalyst comprising a phenolic compound, with the proviso that the phenolic compound is not a phenol which is substituted with tert-butyl groups in both ortho positions to the oxygen.

Clause 15. The method according to Clause 14, wherein the polyamine is selected from ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotoluylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane, and amine-terminated polyether polyols.

Clause 16. The method according to one of Clauses 14 and 15, wherein the Michael addition receptor is selected from the group consisting of dimethyl maleate, diethyl maleate, dibutyl maleate, dimethyl fumarate, diethyl fumarate, dibutyl fumarate, acrylates, and combinations thereof.

Clause 17. The method according to any one of Clauses 14 to 16, wherein the phenolic compound is selected from the group consisting of phenols, phenolic aldehydes, alkylphenols, benzenediols, cashew nut oil, and combinations thereof.

Clause 18. A method of making a polyurea composition comprising reacting a polyisocyanate with the polyaspartic composition made by the method according to one of Clauses 14 to 17.

Clause 19. The method according to Clause 18, wherein the polyisocyanate is selected from the group consisting of ethylene diisocyanate, 1,4-tetramethylene diisocyanate, 1,6-hexamethylene diisocyanate (HDI), 2,2,4-trimethyl-1,6-hexamethylene diisocyanate, 1,12-dodecamethylene diisocyanate, 1-isocyanato-3-isocyanatomethyl-3,5,5-trimethyl-cyclohexane (isophorone diisocyanate or IPDI), bis-(4-isocyanatocyclohexyl)methane ($H_{12}$MDI), cyclohexane 1,4-diisocyanate, bis-(4-isocyanato-3-methyl-cyclohexyl)methane, PDI (pentane diisocyanate-bio-based), benzene diisocyanate, toluene diisocyanate (TDI), diphenylmethane diisocyanate (MDI), 4-isocyanatomethyl-1,8-octane diisocyanate (triisocyanatononane or TIN), isomers of any thereof, and combinations of any thereof.

Clause 20. One of a coating composition, an adhesive composition, a sealant composition, a composite composition, a casting composition, and a film composition comprising the polyurea composition made according to one of Clauses 18 and 19.

Clause 21. A coating composition comprising the polyurea composition according to one of Clauses 18 and 19.

Clause 22. The coating composition according to Clause 21 further including an additive selected from the group consisting of fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators, and extenders.

Clause 23. A substrate having applied thereto the coating composition according to one of Clauses 21 and 22.

Clause 24. The substrate according to Clause 23, wherein the substrate is selected from the group consisting of metal, plastic, wood, cement, concrete, and glass.

Clause 25. The substrate according to Clause 23, wherein the substrate is a floor.

What is claimed is:

1. A polyurea composition comprising a reaction product of:
   (a) a polyaspartic ester reacted from a polyamine and a Michael addition receptor,
   (b) a polyisocyanate, and
   (c) in the presence of a catalyst selected from the group consisting of phenol, catechol, 1,4-benzenediol, cashew nut oil, phenolic aldehydes, resorcinol, 4-ethylresorcinol, 2,5-dimethylresorcinol, phloroglucinol, 2-nitrophloro-glucinol, 5-methoxyresorcinol, orcinol, 2-methylresorcinol, 4-bromoresorcinol, 4-chlororesorcinol, 4,6-dichlororesorcinol, 3,5-dihydroxy-benzaldehyde, 2,4-dihydroxy-benzaldehyde, methyl 3,5-dihydroxy benzoate, methyl 2,4-dihydroxybenzoate, 1,2,4-benzenetriol, pyrogallol, 3,5-dihydroxybenzyl alcohol, 2',6'-dihydroxyacetophenone, 2',4'-dihydroxyacetophenone, 3',5'-dihydroxyacetophenone, 2',4'-dihydroxypropiophenone, 2',4'-dihydroxy-3'-methylacetophenone, 2,4,5-trihydroxy-benzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 2-nitroresorcinol, 1,3-dihydroxynaphthalene, hydroquinone, methylhydroquinone, 2,3-dimethylhydroquinone, 2-methoxyhydroquinone, chlorohydroquinone, 2',5'-dihydroxyacetophenone, 2-isopropyl-1,4-benzenediol, 2,5-dihydroxybenzoic acid, 2,3-dicyanohydroquinone, 1,4-dihydroxynaphthalene, 2',5'-dihydroxypropiophenone, 1-(2,5-dihydroxy-4-methylphenyl)ethanone, tert-butylhydroquinone, methyl 2,5-dihydroxybenzoate, (2,5-dihydroxyphenyl)acetic acid, 2,4,5-trihydroxybenzoic acid, 4,7-dihydroxy-3-methyl-1-indanone, 2,5-dichlorohydroquinone, tetrafluoro-hydroquinone, ethyl 2,5-dihydroxybenzoate, 2-(2,5-dihydroxybenzylidene)malononitrile, 2-bromo-1,4-benzenediol, ethyl(2,5-dihydroxyphenyl)acetate, 1-(2,4,5-trihydroxyphenyl)-1-butanone, methyl 2,5-dihydroxy-4-methoxybenzoate, 2,6-dinitro-1,4-benzenediol, 2,4,5-trihydroxyphenylalanine, (2,5-dihydroxyphenyl)-(phenyl)methanone, 2,5-ditert-butyl-1,4-benzenediol, 2-(6-methylheptyl)-1,4-benzenediol, 2-(1,1,3,3-tetramethylbutyl)-1,4-benzenediol, dimethyl 2,5-dihydroxyterephthalate, 2,4,5-trichloro-3,6-dihydroxybenzonitrile, 2,5-ditert-pentyl-1,4-benzenediol, 2,5-dibromo-1,4-benzenediol, dimethyl 2,4-diethyl-3,6-dihydroxyphenylphosphonate, pyrocatechol, 2,3-naphthalenediol, 5-methyl-1,2,3-benzenetriol, 4-methylcatechol, 3-methylcatechol, 3-fluorocatechol, 3-methoxycatechol, 4-chlorocatechol, 4,5-dichlorocatechol, 4-tert-butylcatechol, 3,4,5,6-tetrachloro-1,2-benzenediol, 3-isopropyl-6-methylcatechol, 3-tert-butyl-6-methylcatechol, 3,4-dihydroxybenzonitrile, 3,5-ditert-butylcatechol, 3,5-diisopropylcatechol, 3,4-dihydroxybenzaldehyde, 4-(1,1,3,3-tetramethylbutyl)-1,2-benzenediol, 4-(1,2-dihydroxyethyl)-1,2-benzenediol, 1-(3,4-dihydroxyphenyl)ethanone, 3,4-dihydroxybenzoic acid, 3,4,5-trihydroxybenzamide, 4-nitro-1,2-benzenediol, 4-(2-amino-1-hydroxyethyl)-1,2-benzenediol, 5-methyl-3-(1,1,3,3-tetramethylbutyl)-1,2-benzenediol, (3,4-dihydroxyphenyl)acetic acid, 2-(3,4-dihydroxybenzyl-idene)malononitrile, 3,5-dinitro-1,2-benzenediol, methyl 3,4-dihydroxybenzoate, 2-chloro-1-(3,4-dihydroxyphenyl)ethanone, phenyl(2,3,4-trihydroxyphenyl)methanone, isopropyl 3,4,5-trihydroxybenzoate, 3,4-dihydroxy-2-methylphenylalanine, 3-bromo-4,5-dihydroxybenzoic acid, 2-(3,4-dihydroxy-5-methoxybenzylidene)malononitrile, ethyl 3-(3,4-dihydroxyphenyl)propanoate, 2-phenyl-1-(2,3,4-trihydroxy-phenyl)ethanone, and 3,4,5-trihydroxy-N-(2-hydroxyethyl)benzamide.

2. The polyurea composition according to claim 1, wherein the polyamine is selected from ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotoluylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane, and amine-terminated polyether polyols.

3. The polyurea composition according to claim 1, wherein the Michael addition receptor is selected from the group consisting of dimethyl maleate, diethyl maleate, dibutyl maleate, dimethyl fumarate, diethyl fumarate, dibutyl fumarate, acrylates, and combinations thereof.

4. The polyurea composition according to claim 1, wherein the polyisocyanate is selected from the group consisting of ethylene diisocyanate, 1,4-tetramethylene diisocyanate, 1,6-hexamethylene diisocyanate, 2,2,4-trimethyl-1,6-hexamethylene diisocyanate, 1,12-dodecamethylene diisocyanate, 1-isocyanato-3-isocyanatomethyl-3,5,5-trimethyl-cyclohexane, bis-(4-isocyanatocyclohexyl) methane (HINDI), cyclohexane 1,4-diisocyanate, bis-(4-isocyanato-3-methyl-cyclohexyl)methane, pentane diisocyanate—bio-based, benzene diisocyanate, toluene diisocyanate, diphenylmethane diisocyanate, 4-isocyanatomethyl-1,8-octane diisocyanate, isomers of any thereof, and combinations of any thereof.

5. One of a coating composition, an adhesive composition, a sealant composition, a composite composition, a casting composition, and a film composition comprising the polyurea composition according to claim 1.

6. A coating composition comprising the polyurea composition according to claim 1.

7. A substrate having applied thereto the coating composition according to claim 6.

8. The substrate according to claim 7, wherein the substrate is selected from the group consisting of metal, plastic, wood, cement, concrete, and glass.

9. The substrate according to claim 7, wherein the substrate is a floor.

10. A method of making a polyurea composition comprising reacting a polyamine with a Michael addition receptor to form a polyaspartic ester, and reacting the polyaspartic ester with an isocyanate in the presence of a catalyst selected from the group consisting of phenol, catechol, 1,4-benzenediol, cashew nut oil, phenolic aldehydes, resorcinol, 4-ethylresorcinol, 2,5-dimethylresorcinol, phloroglucinol, 2-nitrophloro-glucinol, 5-methoxyresorcinol, orcinol, 2-methylresorcinol, 4-bromoresorcinol, 4-chlororesorcinol, 4,6-dichlororesorcinol, 3,5-dihydroxy-benzaldehyde, 2,4-dihydroxy-benzaldehyde, methyl 3,5-dihydroxy benzoate, methyl 2,4-dihydroxybenzoate, 1,2,4-benzenetriol, pyrogallol, 3,5-dihydroxybenzyl alcohol, 2',6'-dihydroxyacetophenone, 2',4'-dihydroxyacetophenone, 3',5'-dihydroxyacetophenone, 2',4'-dihydroxy-propiophenone, 2',4'-dihydroxy-3'-methylacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 2-nitroresorcinol, 1,3-dihydroxynaphthalene, hydroquinone, methylhydroquinone, 2,3-dimethylhydroquinone, 2-methoxyhydroquinone, chlorohydroquinone, 2',5'-dihydroxyacetophenone, 2-isopropyl-1,4-benzenediol, 2,5-dihydroxybenzoic acid, 2,3-dicyanohydroquinone, 1,4-dihydroxynaphthalene, 2',5'-dihydroxypropiophenone, 1-(2,5-dihydroxy-4-methylphenyl)ethanone, tert-butylhydroquinone, methyl 2,5-dihydroxybenzoate, (2,5-dihydroxyphenyl)acetic acid, 2,4,5-trihydroxybenzoic acid, 4,7-dihydroxy-3-methyl-1-indanone, 2,5-dichlorohydroquinone, tetrafluoro-hydroquinone, ethyl 2,5-dihydroxybenzoate, 2-(2,5-dihydroxybenzylidene)malononitrile, 2-bromo-1,4-benzenediol, ethyl(2,5-dihydroxyphenyl)acetate, 1-(2,4,5-trihydroxyphenyl)-1-butanone, methyl 2,5-dihydroxy-4-methoxybenzoate, 2,6-dinitro-1,4-benzenediol, 2,4,5-trihydroxyphenylalanine, (2,5-dihydroxyphenyl)-(phenyl)methanone, 2,5-ditert-butyl-1,4-benzenediol, 2-(6-methylheptyl)-1,4-benzenediol, 2-(1,1,3,3-tetramethylbutyl)-1,4-benzenediol, dimethyl 2,5-dihydroxyterephthalate, 2,4,5-trichloro-3,6-dihydroxybenzonitrile, 2,5-ditert-pentyl-1,4-benzenediol, 2,5-dibromo-1,4-benzenediol, dimethyl 2,4-diethyl-3,6-dihydroxy-phenylphosphonate, pyrocatechol, 2,3-naphthalenediol, 5-methyl-1,2,3-benzenetriol, 4-methylcatechol, 3-methylcatechol, 3-fluorocatechol, 3-methoxycatechol, 4-chlorocatechol, 4,5-dichlorocatechol, 4-tert-butylcatechol, 3,4,5,6-tetrachloro-1,2-benzenediol, 3-isopropyl-6-methylcatechol, 3-tert-butyl-6-methylcatechol, 3,4-dihydroxybenzonitrile, 3,5-ditert-butylcatechol, 3,5-diisopropylcatechol, 3,4-dihydroxybenzaldehyde, 4-(1,1,3,3-tetramethylbutyl)-1,2-benzenediol, 4-(1,2-dihydroxyethyl)-1,2-benzenediol, 1-(3,4-dihydroxyphenyl)ethanone, 3,4-dihydroxybenzoic acid, 3,4,5-trihydroxybenzamide, 4-nitro-1,2-benzenediol, 4-(2-amino-1-hydroxyethyl)-1,2-benzenediol, 5-methyl-3-(1,1,3,3-tetramethylbutyl)-1,2-benzenediol, (3,4-dihydroxyphenyl)acetic acid, 2-(3,4-dihydroxybenzyl-idene)malononitrile, 3,5-dinitro-1,2-benzenediol, methyl 3,4-dihydroxybenzoate, 2-chloro-1-(3,4-dihydroxyphenyl)ethanone, phenyl(2,3,4-trihydroxyphenyl)methanone, isopropyl 3,4,5-trihydroxybenzoate, 3,4-dihydroxy-2-methylphenylalanine, 3-bromo-4,5-dihydroxybenzoic acid, 2-(3,4-dihydroxy-5-methoxybenzylidene)malononitrile, ethyl 3-(3,4-dihydroxyphenyl)propanoate, 2-phenyl-1-(2,3,4-trihydroxy-phenyl)ethanone, and 3,4,5-trihydroxy-N-(2-hydroxyethyl)benzamide.

11. The method according to claim 10, wherein the polyamine is selected from ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotoluylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane, and amine-terminated polyether polyols.

12. The method according to claim 10, wherein the Michael addition receptor is selected from the group consisting of dimethyl maleate, diethyl maleate, dibutyl maleate, dimethyl fumarate, diethyl fumarate, dibutyl fumarate, acrylates, and combinations thereof.

13. One of a coating composition, an adhesive composition, a sealant composition, a composite composition, a casting composition, and a film composition comprising the polyurea composition made according to claim 10.

* * * * *